No. 642,506. Patented Jan. 30, 1900.
M. J. TODD.
HARROW.
(Application filed Apr. 6, 1899.)
(No Model.) 4 Sheets—Sheet 1.
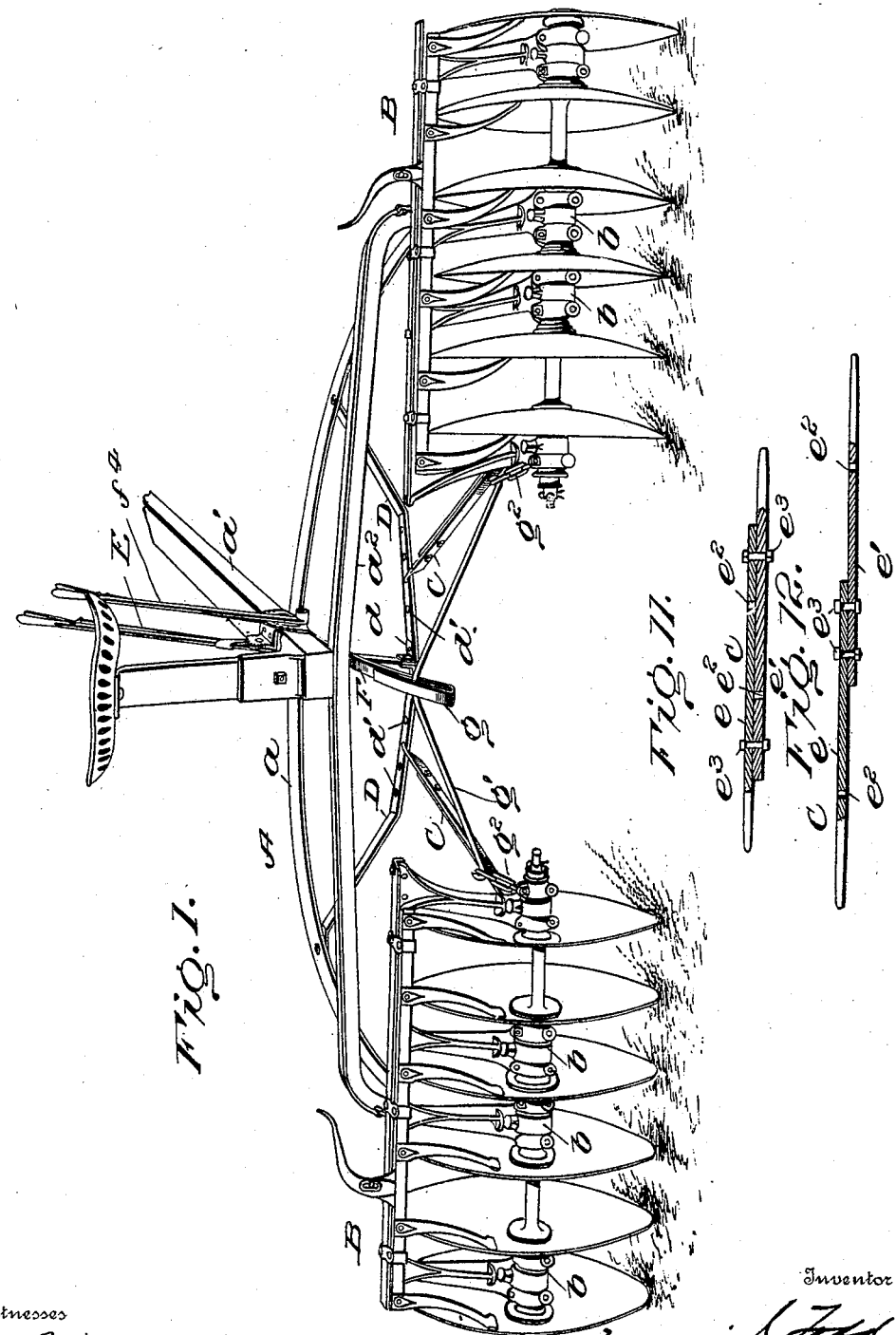

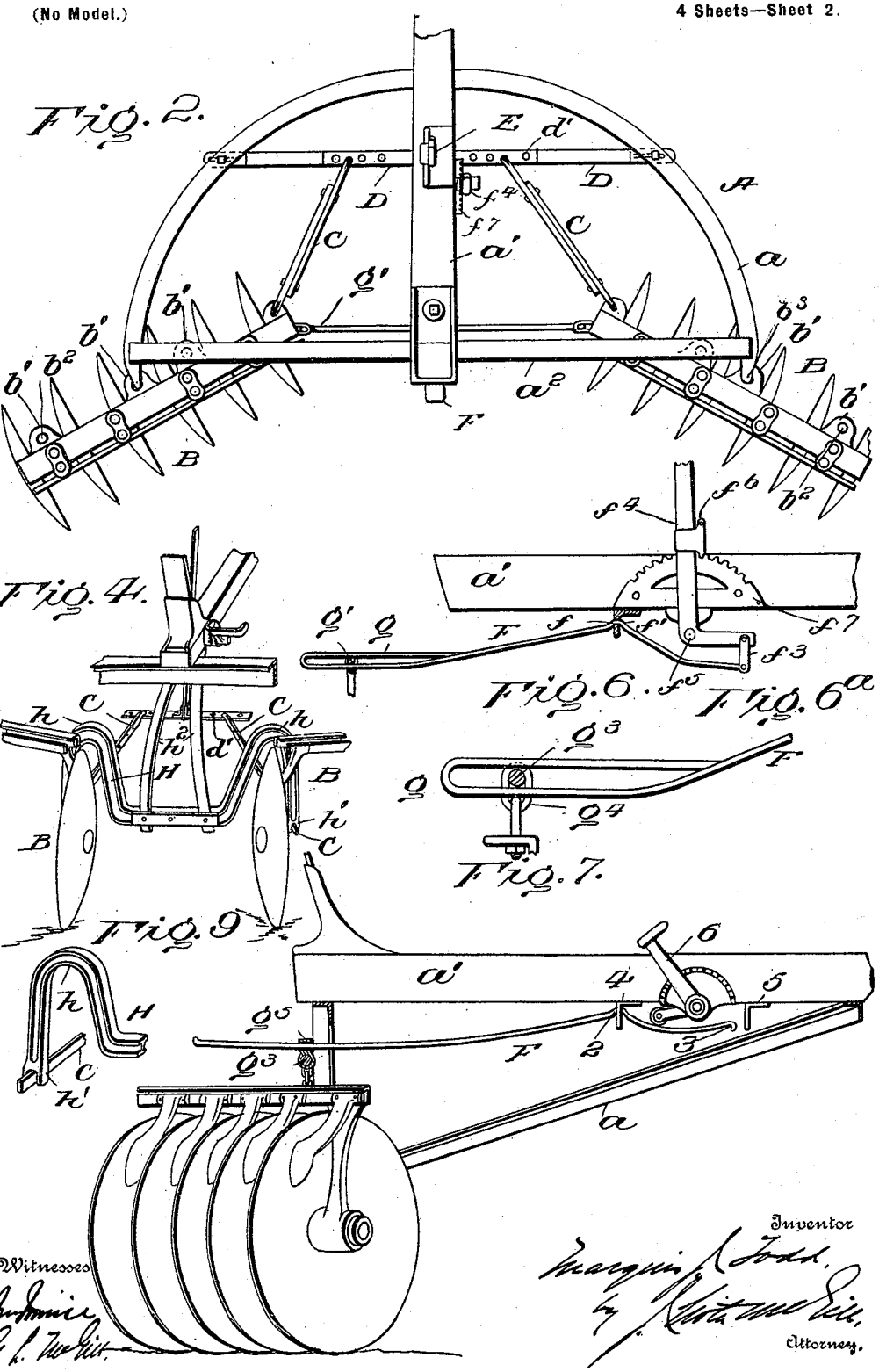

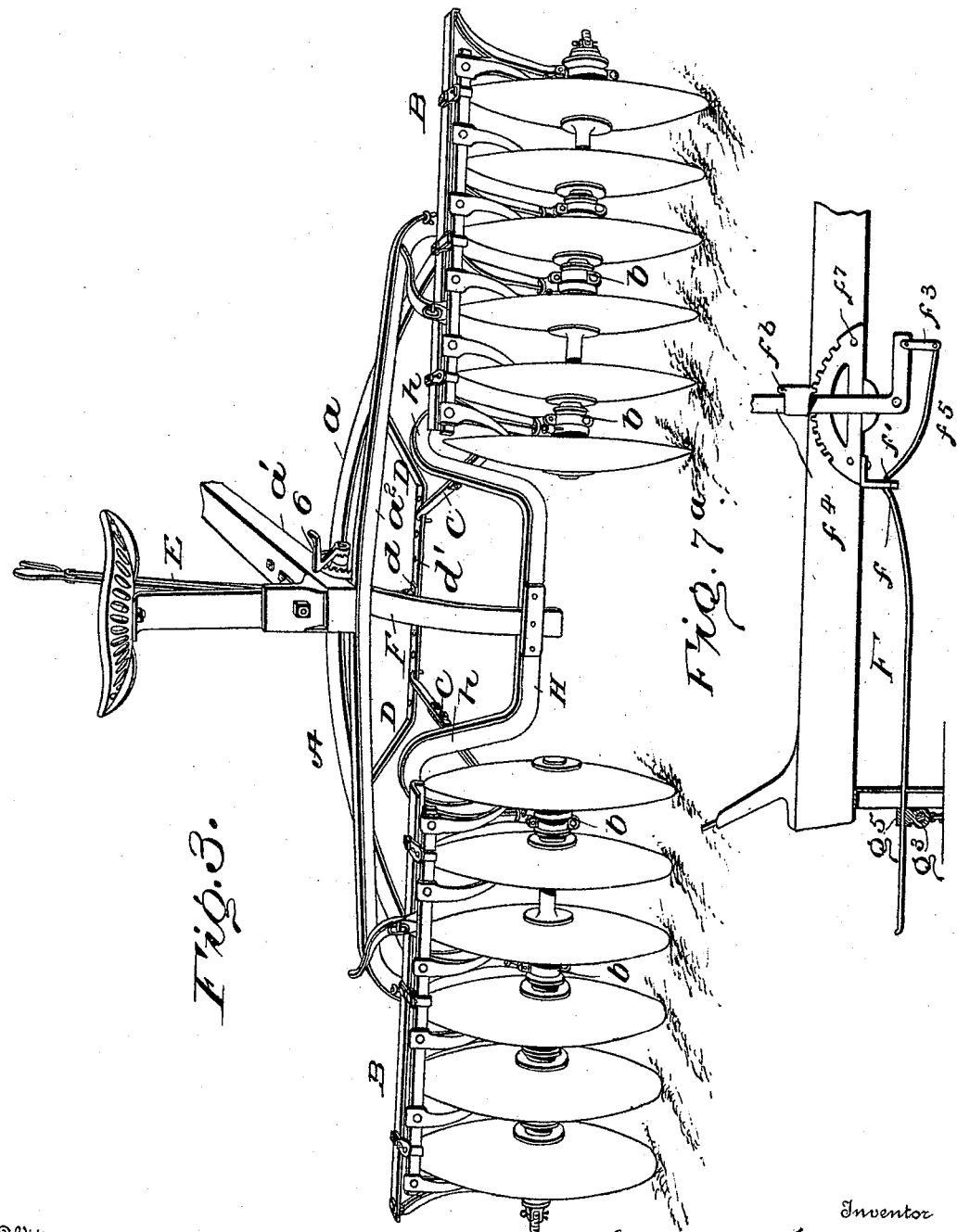

No. 642,506. Patented Jan. 30, 1900.
M. J. TODD.
HARROW.
(Application filed Apr. 6, 1899.)
(No Model.) 4 Sheets—Sheet 4.
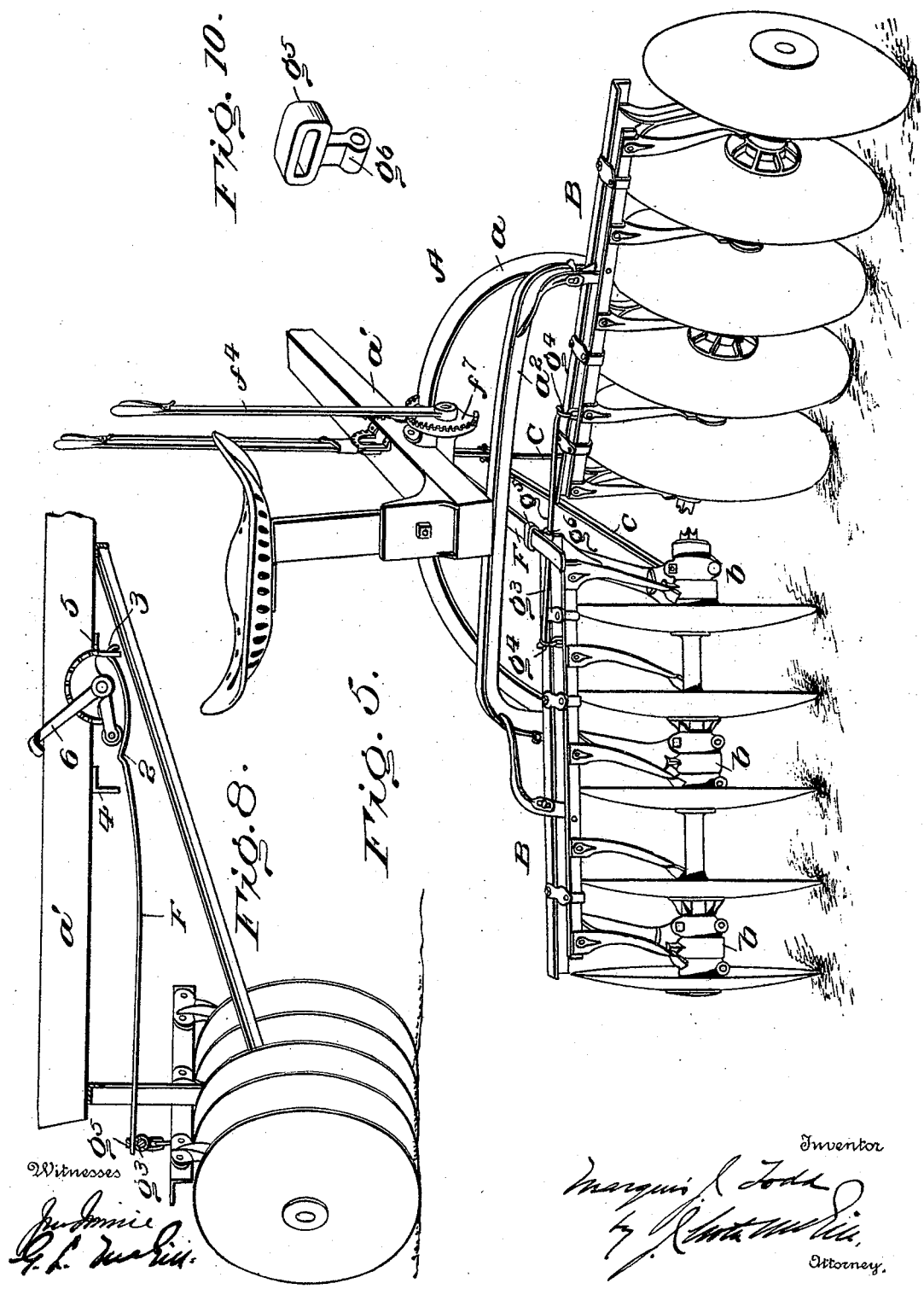

UNITED STATES PATENT OFFICE.

MARQUIS J. TODD, OF BUFFALO, NEW YORK.

HARROW.

SPECIFICATION forming part of Letters Patent No. 642,506, dated January 30, 1900.

Application filed April 6, 1899. Serial No. 711,937. (No model.)

*To all whom it may concern:*

Be it known that I, MARQUIS J. TODD, of Buffalo, in the county of Erie and State of New York, have invented certain new and useful Improvements in Harrows; and I do hereby declare the following to be a full, clear, and exact description of the invention, such as will enable others skilled in the art to which it appertains to make and use the same.

This invention contemplates certain new and useful improvements in harrows, having reference to the class employing gangs of disks axially mounted and capable of adjustment relatively to the line of draft.

The primary object of the invention is to enable the disk gangs when positioned either for inthrows or outthrows to be set at different distances apart.

A further object of the invention is to provide improved means for shifting or adjusting the gangs when extended for outthrows or inthrows.

A further object is to provide spring-pressure for the inner ends of the gangs when set for either inthrows or outthrows, whereby the cut of the gangs at both ends will be controlled and maintained uniform.

A further object is to provide simple and efficient mechanism whereby a single spring-bar may be used for exerting a lifting or depressing action upon the inner ends of the gangs.

The invention will be hereinafter fully set forth, and particularly pointed out in the claims.

In the accompanying drawings, Figure 1 is a view in perspective of a disk harrow with the gangs extended and set for inthrow. Fig. 2 is a plan view thereof. Fig. 3 is a perspective view showing the gangs extended and set for outthrow. Fig. 4 shows a slight modification of the spring-bar. Fig. 5 is a perspective view, the gangs being set close together; also different form of adjusting means for the gangs. Fig. 6 is a side elevation with the gangs removed, showing the spring as in Fig. 1. Fig. 6ᵃ is an enlarged view of part of spring shown in Fig. 6. Fig. 7 is a side elevation of the form shown in Fig. 5 with one of the gangs removed, the spring being set for uplift with modified form of operating means. Fig. 7ᵃ is a side elevation showing the spring of Fig. 7 equipped with the operating-lever of Fig. 6. Fig. 8 is a view similar to Fig. 7 with the disks reversed, showing the spring-bar positioned to depress the inner ends of the gangs. Fig. 9 is a view showing portion of the spanning-rod of Figs. 3 and 4. Fig. 10 is an enlarged view of a detail. Figs. 11 and 12 show, respectively, one of the adjusting-bars shortened and lengthened.

In disk harrows each gang is pivotally connected or fulcrumed, so to speak, at some point intermediate of its ends to the harrow-frame. This connection may be varied according to the space it is desired should exist between the inner ends of the gangs—that is, the gangs may be set close together or extended apart. By my present invention the means for adjusting the gangs relatively to the line of draft is applicable for use in any position in which the gangs may be set relatively to each other. It is also applicable for use in the adjustment of the gangs relatively to the line of draft, whether they be set for inthrows or outthrows. When set for the former, the inner ends of the gangs are thrown forward, while for outthrows the inner ends are thrown rearward. The means in which this improvement is embodied embraces adjusting-bars capable of being lengthened or shortened and swinging members, such as levers, to which the adjusting-bars may be secured at different points, according to the length of the throw to be given the inner ends of the gangs, which throw is increased or lessened as such inner end is farther from or nearer to the fulcrum-point of the gang. When the gangs are set for inthrows, the tendency is to cut too deep at their inner ends, while when they are set for outthrows it is necessary to hold down the inner ends to prevent the gangs from rising.

In Letters Patent No. 527,352, granted to me October 9, 1894, I showed, described, and claimed means for holding the gangs down to their work. This I accomplished by spring-pressure applied to the inner ends of the gangs. The said means constituted a radical improvement in this class of inventions and resulted in overcoming the great annoyance and difficulty heretofore experienced in the use of disk harrows. By my present invention I contemplate providing simple and highly-efficient means for controlling the cut of the two gangs by exerting a raising or depressing action on their inner ends, according as the gangs may be set for inthrows or outthrows. This means comprehends a spring-bar secured to the harrow-frame and having engagement with the inner ends of the gangs, so that the tension thereon may be regulated at will.

Referring to the drawings, A designates the harrow-frame, which comprises a bar $a$, a pole $a'$, and yoke $a^2$.

B B designate the two gangs of disks constructed in the usual manner. Each gang has a plurality of bearings $b$ for the gang-axle, such bearings being at the ends and intermediate points. Each bearing has an ear $b'$, formed with an opening $b^2$ to receive the hooked end $b^3$ of the frame-bar $a$. In thus pivotally connecting each gang to the frame the same is capable of being swung on its fulcrum, like a lever, in being set angularly to the line of draft, and by having a plurality of points along each gang for connection thereof to the frame-bar the inner arm of the gang may be shortened or lengthened. When the pivotal connection between a gang and the frame is at the outer end of the gang, a greater sweep is required at the inner end in setting the gang obliquely than when the connection is at any inner point. A lesser sweep or movement will then effect the setting of the gangs obliquely to the line of draft.

C C designate the adjusting-bars having hooked ends, and which at one end are connected to the inner ends of the gangs, while their forward ends are secured to means for moving them backward and forward. This means comprises two levers D D and an upright lever E, fulcrumed on the pole $a'$. The levers D consist of two bars fulcrumed at their outer ends to frame-bar $a$, and after being extended downward are carried inward and pivotally united at their ends to lever E by being loosely bolted to flanged ends of a clip $d$ on the lower end of said lever. In the horizontal portion of each lever D is formed a plurality of holes $d'$, in any one of which the hooked end of one of the bars C is designed to be placed. The location of holes $d'$ corresponds to the points at which each gang may be fulcrumed to frame-bar $a$. As the length of the inner arm of the gang is shortened the point of connection of its adjusting-bar C to its lever D is moved nearer to the fulcrum of such lever, and as the length of said inner arm is increased the arm C is joined to lever D near to the outer end of the latter and farther from its fulcrum—that is to say, when the ends of the frame-bar $a$ are connected to the outer bearings of the gangs the hooked ends of adjusting-bars C are made to engage the outermost hole of each lever D, this being changed as the length of the inner arm of each gang is shortened.

In order that the adjusting-bars C may be applicable for use when the gangs are set both for inthrows and outthrows, I make each bar in two sections $e\ e'$. In these sections are holes $e^2$, through which nutted bolts $e^3$ may be passed. The extended length is required when the gangs are set for outthrows, while when they are positioned for inthrows the bars are shortened, since the inner ends of the gangs are then thrown forward nearer to the adjusting-lever E in being set obliquely to the line of draft.

The next feature of the present invention resides in the spring-pressure attachment for the inner ends of the gangs. This comprises a spring-bar fulcrumed on the harrow-frame and adapted to exert pressure on the inner ends of the gangs either to lift or depress them, according as they are set for inthrows or outthrows. A cross-rod spans the space between the gangs, being secured directly to the latter or engaging the gang-adjusting bars close up to their connections to the gangs. The spring-bar may so engage the cross-rod as to permit of a sliding movement of the cross-rod with the gangs or to permit the gangs to be adjusted without moving the cross-rod. The spring-bar may be positively connected to an operating-lever which will regulate its tension, whether the gangs be set for inthrows or outthrows, or the tension may be controlled by a cam-lever, in which case the spring-bar is fulcrumed in rear or in advance of the lever, according as a lifting or depressing action is desired. These several forms of application are clearly shown in the drawings. They comprise a spring-bar F, fulcrumed on the harrow-frame and adapted to exert pressure on the inner ends of the gangs, so as to lift or depress them. The bar F is fulcrumed on a clip $f$, bolted to the under side of the pole. This clip has a slot through which the bar is inserted, a crimped portion $f'$ of the bar engaging the lower cross-piece of the clip. In this way the spring-bar is held as against slipping longitudinally. The forward end of the bar F may be connected by a link $f^3$ to a bell-crank lever $f^4$, fulcrumed at $f^5$ on a bracket secured to pole $a'$. (See Fig. 6.) The long arm of this lever carries a holding-pawl $f^6$, which engages a rack-bar $f^7$. By operating this lever the rear end of the spring-bar will be raised or lowered. Thus the tension of the spring-bar is controlled. The application of pressure to the inner ends of the gangs may be through various connections between the gangs and the spring-bar. I do not restrict myself to any one form of connection or any one form of applying the spring-pressure.

In Figs. 1, 6, and 7 I have shown the bar F bent back over itself, forming an elongated loop $g$. In Fig. 1 a cross-bar $g'$ is shown extended through the loop of the spring-bar and connected at its ends by short chains $g^2$ to the inner ends of the gangs. When the gangs are set in close together, as in Fig. 5, the cross-rod $g^3$ engages at its ends rings $g^4$, held by bolts to the gang scraper-bars. In this figure I have shown the spring-bar without its loop and extended through a loop-block $g^5$ of approximately T shape, having in its lower portion $g^6$ a rounded opening to accommodate the cross-rod $g^8$. Whether the loop be formed in the spring-bar or the latter extended through the loop on the cross-rod the result is the same. The gangs are free to be adjusted without interfering with the spring-bar and cross-rod. In Fig. 6 the cross-rod $g^7$ is shown in loop $g$, while in Fig. 6ª the cross-rod $g^8$ is shown. Whether the gangs be set for inthrows or outthrows the spring-bar F will exert a tension on the inner ends of the gangs, and this tension may be regulated by the adjustment of the lever $f^4$.

Another form of embodiment of the spring attachment consists in forming the spring-bar with two crimped portions 2 and 3 for engagement, respectively, with clips 4 and 5 on the under side of the pole. The former is located in rear of a cam-lever 6 and the other in advance of such lever. This cam-lever bears down on the forward part of the spring-bar. When the gangs are set for inthrows, the spring-bar is placed in engagement with the clip 4, as shown in Fig. 7, while when the gangs are set for outthrows the crimped end 3 of the spring-bar is placed in engagement with clip 5. (See Fig. 8.) In the former pressure of the cam-lever causes the spring-bar to exert lifting action, while in the latter arrangement depressing action is exerted on the inner ends of the gangs. When the latter are extended for outthrows, the rear end of the spring-bar F may be firmly connected to a cross rod or bar H, which is arched at $h$ to accommodate the inner disks of the two gangs. The ends $h'$ of this rod are forked to accommodate the gang-adjusting bars C. Thus the pressure is applied close to the inner ends of the gangs, the ends of the cross-rod resting on the gang-adjusting bars close up to the connections of the latter with the gangs. As shown in Fig. 4, the spring-pressure bar F may be duplicated—that is, formed in two parts $h^2$, which at their rear ends are secured to the cross-rod H. In all these different forms of embodiment of the spring-pressure attachment a lifting or depressing action is exerted on the inner ends of the gangs. In this way the cut of both the inner and outer ends of the gangs is controlled and rendered uniform.

The tension of the spring may be regulated according to the character of the soil and the angularity of the gangs. The latter are free to rise upon coming in contact with a stone or other obstruction.

I claim as my invention—

1. In a disk harrow, the combination with the frame, of disk gangs, each gang having a pivotal connection with the frame whereby it is capable of moving vertically at its ends, such pivotal connection being at one of a plurality of points intermediate of the ends of each gang, to allow the gangs to be set at different distances apart, and means connected to the gangs for adjusting them relatively to the line of draft, substantially as set forth.

2. In a disk harrow, the combination with the frame, of the disk gangs, each gang having a pivotal connection with the frame whereby it is capable of moving vertically at its ends, such pivotal connection being at one of a plurality of points intermediate of the ends of each gang to allow the gangs to be set at different distances apart, adjusting-bars connected to such gangs, and operating mechanism to which the adjusting-bars may be connected at a plurality of points, such connection of each adjusting-bar being regulated by the point of connection of its gang to the frame, as set forth.

3. In a disk harrow, the combination with the frame, of disk gangs, each gang having a pivotal connection with the frame whereby it is capable of moving vertically at its ends, such pivotal connection being at one of a plurality of points intermediate of the ends of each gang to allow the gangs to be set at different distances apart, extensible and contractible adjusting-bars connected to such gangs, an operating-lever, and a connection between such lever and the adjusting-bars, the latter being capable of being secured to such connection at a plurality of points, as set forth.

4. In a disk harrow, the combination with the frame, of disk gangs pivotally connected to said frame, adjusting-bars attached to the inner ends of said gangs, levers fulcrumed at their outer ends on said frame and to which said adjusting-bars are secured, and an operating-lever to which both of said former levers are connected, substantially as set forth.

5. In a disk harrow, the combination with the frame, of the disk gangs having each a plurality of points intermediate of its ends at any one of which it may be pivotally connected to said frame, adjusting-bars secured to said gangs, an operating-lever, and swinging connections between said lever and said bars, said bars being capable of being secured to said swinging connections at a plurality of points, substantially as set forth.

6. In a disk harrow, the combination with the frame, of the disk gangs having each a plurality of points intermediate of its ends at any one of which it may be pivotally connected to said frame, adjusting-bars secured to said gangs, levers having a plurality of points for connection thereto of said adjusting-bars, and means for operating said levers, substantially as set forth.

7. In a disk harrow, the combination with the frame, of the disk gangs having each a plurality of points intermediate of its ends at any one of which it may be pivotally connected to said frame, adjusting-bars secured to said gangs, levers having a plurality of points for connection thereto of said adjusting-bars, and an operating-lever common to both of the former levers, substantially as set forth.

8. The combination with the frame, of the disk gangs having each a plurality of points intermediate of its ends at any one of which it may be pivotally connected to said frame, extensible and contractible adjusting-bars having hooked ends, levers fulcrumed at their outer ends on said frame and having each a plurality of securing-points for the forward ends of said adjusting-bars, the rear ends of said bars being secured to said gangs, and an operating-lever mounted on said frame and connected at its lower end to the inner ends of said levers, substantially as set forth.

9. The combination with the frame, of the disk gangs, means for adjusting the gangs relatively to the line of draft, a connection spanning the space between the gangs, a spring engaging said connection, and means for regulating the tension of said spring, substantially as set forth.

10. The combination with the frame, of the disk gangs, a cross-rod spanning the space between the gangs, and a spring-bar for exerting tension on said cross-rod, as set forth.

11. The combination with the frame, of the disk gangs, means for adjusting the gangs relatively to the line of draft, a connection spanning the space between the gangs, a spring-bar fulcrumed on said frame and engaging said connection, and a lever on said frame for acting on said spring-bar, substantially as set forth.

12. The combination with the frame, of the disk gangs, means for adjusting the gangs relatively to the line of draft, a cross-rod extending over the space between the gangs, a spring-bar fulcrumed on the frame and engaging said cross-rod, and a lever on said frame for acting on said spring-bar, substantially as set forth.

13. The combination with the frame, of the disk gangs, means for adjusting the latter relatively to the line of draft, a cross-rod spanning the space between the gangs, a spring-bar, having a sliding engagement with such cross-rod, and a lever on the frame for acting on the spring-bar, substantially as set forth.

14. The combination with the frame, of the disk gangs, means for adjusting the latter relatively to the line of draft, a cross-rod spanning the space between the gangs, a spring-bar, a loop forming a sliding connection between the cross-rod and spring-bar, and a lever on the frame for acting on the spring-bar, substantially as set forth.

15. The combination with the frame, of the disk gangs, means for adjusting the latter relatively to the line of draft, a cross-rod spanning the space between the gangs, a spring-bar, a loop on the cross-rod through which the spring-bar is extended, and a lever on the frame for acting on the spring-bar, substantially as set forth.

16. The combination with the frame, of the disk gangs, means for adjusting the latter relatively to the line of draft, a cross-rod spanning the space between the gangs, a spring-bar, a loop forming a sliding connection between the cross-rod and spring-bar, a bell-crank lever fulcrumed on the frame, and a link connecting one end of such lever to the spring-bar, substantially as set forth.

17. The combination with the frame, of the disk gangs, means for adjusting said gangs relatively to the line of draft, a cross-rod extending over the space between and secured to the gangs, a spring-bar having a sliding connection with the cross-rod and also having a crimp therein, a clip secured to the frame having an opening to accommodate said crimp, and a lever fulcrumed on said frame for acting on said spring-bar, substantially as set forth.

18. The combination with the frame, of the disk gangs, means for adjusting the same relatively to the line of draft, a spring-bar fulcrumed on the frame, a cross-rod connected at its ends to the gangs, a loop for the spring-bar, mounted on the cross-rod, and a lever fulcrumed on the frame and designed to act on the spring-bar, substantially as set forth.

In testimony whereof I have signed this specification in the presence of two subscribing witnesses.

MARQUIS J. TODD.

Witnesses:
JOHN B. OLMSTED,
F. R. KEATING.